Sept. 23, 1969 A. M. KHAZEN 3,469,199

MAGNETIC AMPLIFIER

Filed Nov. 3, 1966 2 Sheets-Sheet 1

Sept. 23, 1969 A. M. KHAZEN 3,469,199

MAGNETIC AMPLIFIER

Filed Nov. 3, 1966 2 Sheets-Sheet 2

United States Patent Office 3,469,199
Patented Sept. 23, 1969

3,469,199
MAGNETIC AMPLIFIER

Alexandr Moiseevich Khazen, Molodogvardeiskaya ulitsa 36, korpus 1, kv. 48, Moscow, U.S.S.R.

Filed Nov. 3, 1966, Ser. No. 591,882
Int. Cl. H03f *9/00*
U.S. Cl. 330—8 2 Claims

ABSTRACT OF THE DISCLOSURE

The invention relates to a magnetic amplifier comprising at least one ferrite core, a supply winding fed with a high-frequency current, a bias winding and a cutoff winding; the improvement consists in further providing the amplifier with electrodes or buses applied to the core or cores in such a manner that the electric field set up by these electrodes in the core or cores is perpendicular to the high-frequency magnetic field produced by the supply winding when it is fed by a high-frequency current.

The present invention relates to magnetic amplifiers and in particular to low-power magnetic amplifier-modulators used for amplifying low level signals supplied to the input of digital computers.

Known magnetic amplifiers comprise two solid cores or a single film-type core fitted with high-frequency supply, bias, compensating, output and cutoff windings, the even-number harmonics of the supply frequency applied to the magnetic amplifier being generally employed for producing the output signal. The control signal of these magnetic amplifiers is usually provided by the magnetic field set up by the flow of the input current through a winding arranged in the same manner as the output winding.

An inherent disadvantage of conventional magnetic amplifiers is their low input resistance as control of the amplifier is implemented by the same current that sets up the magnetic field.

It is a primary object of the present invention to eliminate said disadvantage.

A further object of the invention is to provide a device having the advantages of above magnetic amplifiers (high reliability, high power amplification factor, low threshold signal and noise level, zero stability at operation with direct current signals) and a high input resistance greater than is available in the case of semiconductor instruments.

With these objects in view, the core of the herein proposed magnetic amplifier is provided with buses or electrodes applied to the core and arranged in such a manner that the resulting electric control field is perpendicular to the alternating magnetic supply field produced in the cores.

The invention will further be described by way of example with reference to the accompanying drawings, wherein.

Figure 1:
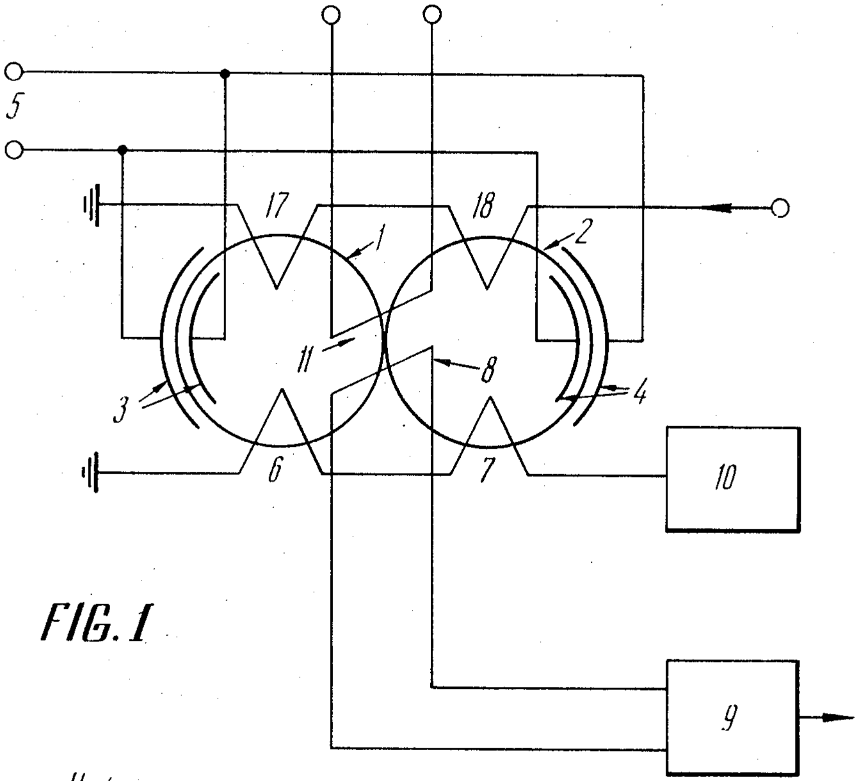
FIG. 1 shows the electrical circuit of the magnetic amplifier with two cores of solid ferrite, according to the invention.
Figure 4:
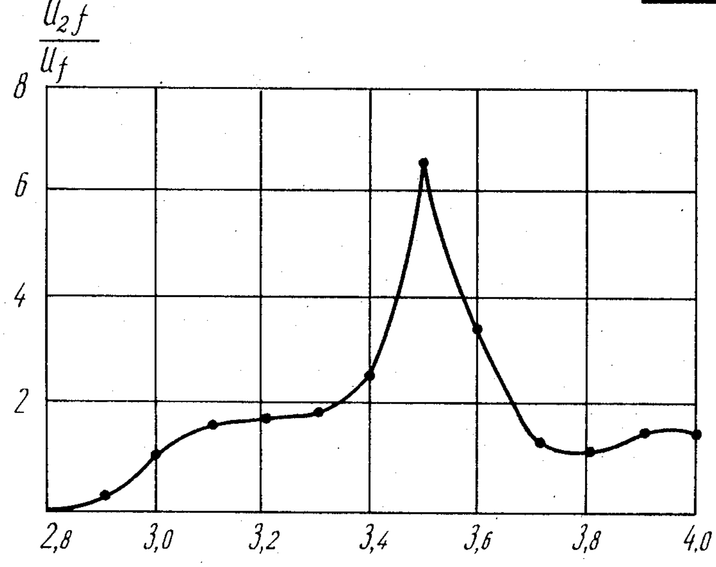
FIG. 4 shows the experimentally obtained output signal curve of the magnetic amplifier.

Referring to FIG. 1, the magnetic amplifier comprises ferrite cores 1, 2 fitted with metal control buses or electrodes 3, 4. The control signal is supplied to buses 3, 4 from input terminals 5 and sets up an electric control field in cores 1, 2 that is perpendicular to the high-frequency magnetic supply field produced by supply windings 6, 7. Buses 3, 4 are in direct electrical contact with the material of the core. In cases when an alternating voltage is employed as the input signal, buses 3, 4 may be separated from cores 1, 2 by an insulating film.

Supply windings 6, 7 are wound separately on each of cores 1, 2 over control buses 3, 4 and are insulated from the latter. Output winding 8 is wound over both cores 1, 2 and the cores are put together so that the magnetic fields set up in them by windings 6, 7 are in opposition. Output winding 8 is connected to selective amplifier 9, the latter being tuned in resonance with the second harmonic of the frequency of generator 10 supplying windings 6, 7.

Compensating winding 11 is wound over both cores 1, 2 in the same manner as the output winding. Winding 11 is supplied with a current that serves for compensating the second harmonic of the magnetic amplifier supply frequency generated by the control signal in output winding 8. Winding 11 is connected when the magnetic amplifier is employed as a zero-organ in measuring systems.

Figure 2:
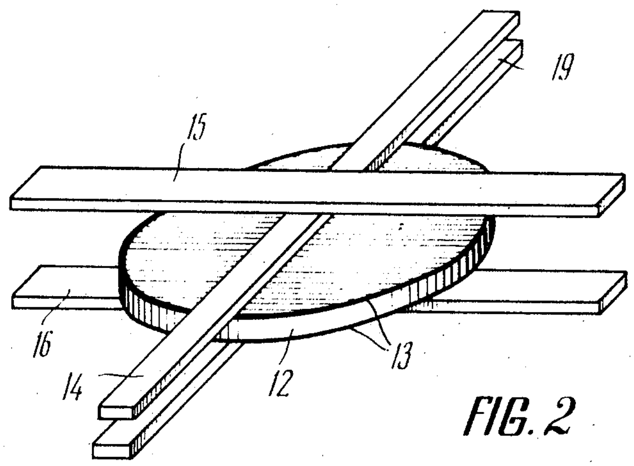
FIG. 2 shows the magnetic amplifier with cores of flat ferromagnetic film.
Figure 3:
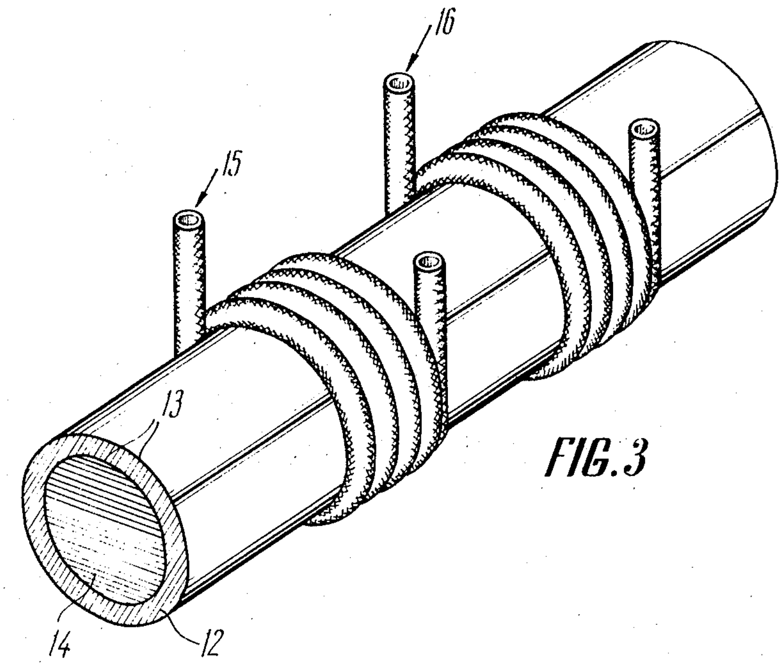
FIG. 3 shows the magnetic amplifier with a core of round ferromagnetic film.

In cases when the magnetic amplifier is provided with a film-type core as shown in FIGS. 2, 3 only a single core 12 is used, the latter being in the form of a flat (FIG. 2) or round (FIG. 3) film of ferrite to which control buses or electrodes 13 and, also, buses equivalent to the respective windings are directly applied. Supply bus 14 is equivalent to supply windings 6, 7 (FIG. 1), output bus 15 is equivalent to output windings 8 and compensating bus 16 is equivalent to winding 11 (FIG. 1). Certain buses may combine the functions of two windings. The magnetic field of supply bus 14 is perpendicular to the magnetic field of compensating bus 16 that coincides with the direction of the field of output bus 15.

The magnetic amplifier provided with cores of the stated material operates efficiently at specified supply frequencies. The dependence of the output signal upon the frequency of variation of the supply field within a range from 3 to 4 mc./s. is shown in FIG. 5. The strength of the electric control field is equal to 100 v./cm. The core is made of nickel-zinc ferrite. The magnetic amplifier can also be employed as a key for interrupting the transmission of the signal from the input to the output. This is realized by making use of winding 17, 18 (FIG. 1) or bus 19 (FIG. 2). For the magnetic amplifier shown in FIG. 3, the function of the latter bus is performed by supply bus 14 itself. Cutoff buses 14, 19 (or cutoff windings 17, 18) are oriented in the same way as supply windings 6, 7 or supply bus 14. The operation of the magnetic amplifier is discontinued at supply of a direct current of great value to cutoff windings 17, 18 or cutoff bus 19, 14.

What is claimed is:

1. In a magnetic amplifier comprising:
at least one core made of a ferrite material;
at least one supply winding fitted on said core;
means for feeding a high-frequency current through said supply winding;
at least one bias winding fitted on said core;
at least one compensating winding fitted on said core;
at least one output winding fitted on said core and disposed perpendicularly to said supply winding;
at least one cutoff winding fitted on said core and arranged in the same manner as said supply winding;
the improvement consisting in further providing said amplifier with at least two electrodes and means for feeding said electrodes with an input voltage, said electrodes being arranged on said core so that the electric control field set up by these electrodes in said core, when they are fed by said last-mentioned means with an input voltage, is perpendicular to the high frequency magnetic field produced by said supply winding when said first-mentioned means feed a high-frequency current therethrough.

2. A magnetic amplifier according to claim 1 comprising two cores wherein the output, compensating and bias windings embrace both said cores.

References Cited

UNITED STATES PATENTS 3,202,871 8/1965 Shelar ............ 330—8 X
3,392,323 7/1968 Darling ............ 330—8 X NATHAN KAUFMAN, Primary Examiner U.S. Cl. X.R.

323—89; 330—65